Nov. 11, 1941.   W. S. WYKES ET AL   2,262,153
BAFFLE FOR DOMESTIC HEATING FURNACES
Filed March 30, 1940   4 Sheets-Sheet 1

Inventors
Wm S Wykes
and Edward I Joffe
Attorney.

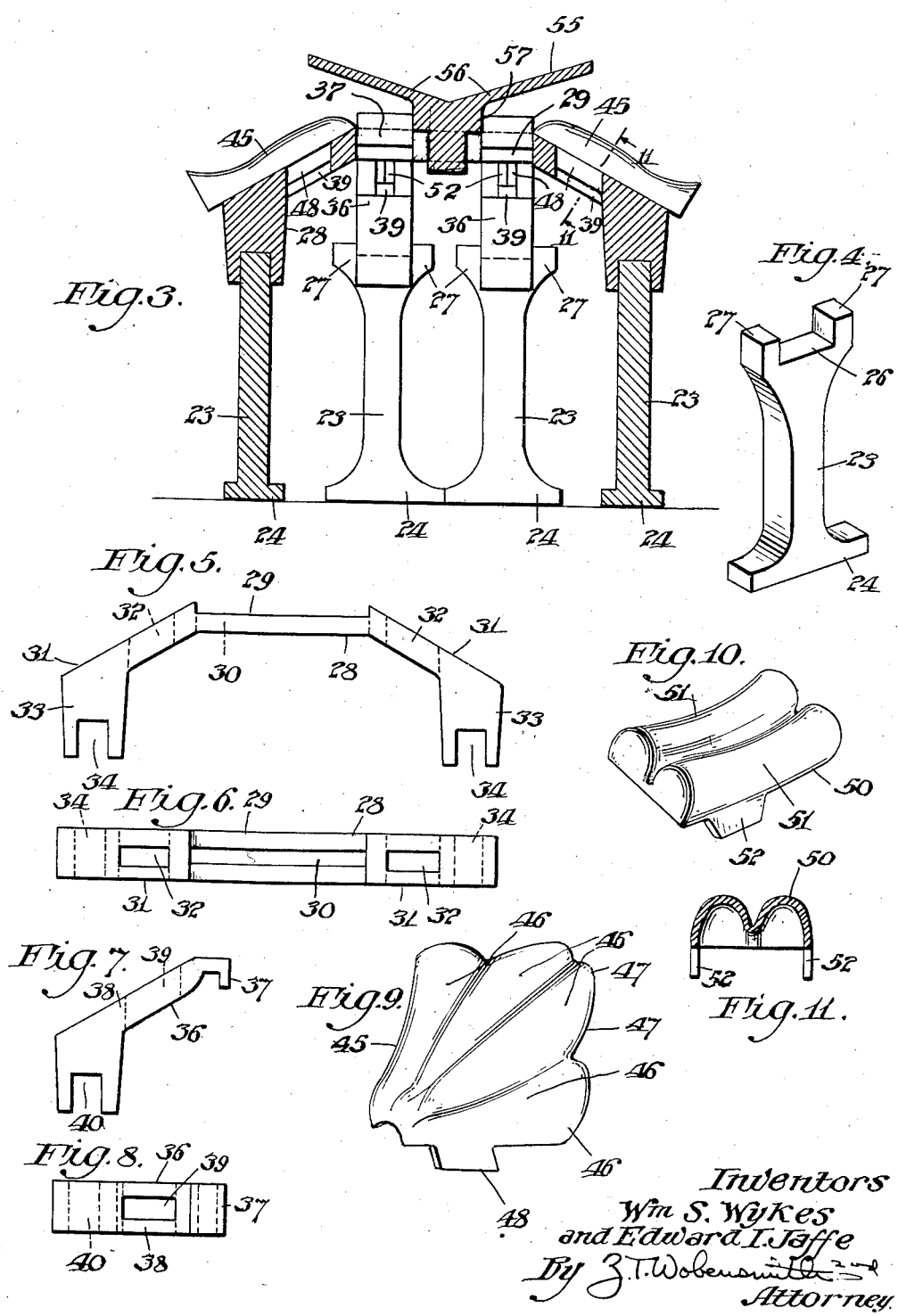

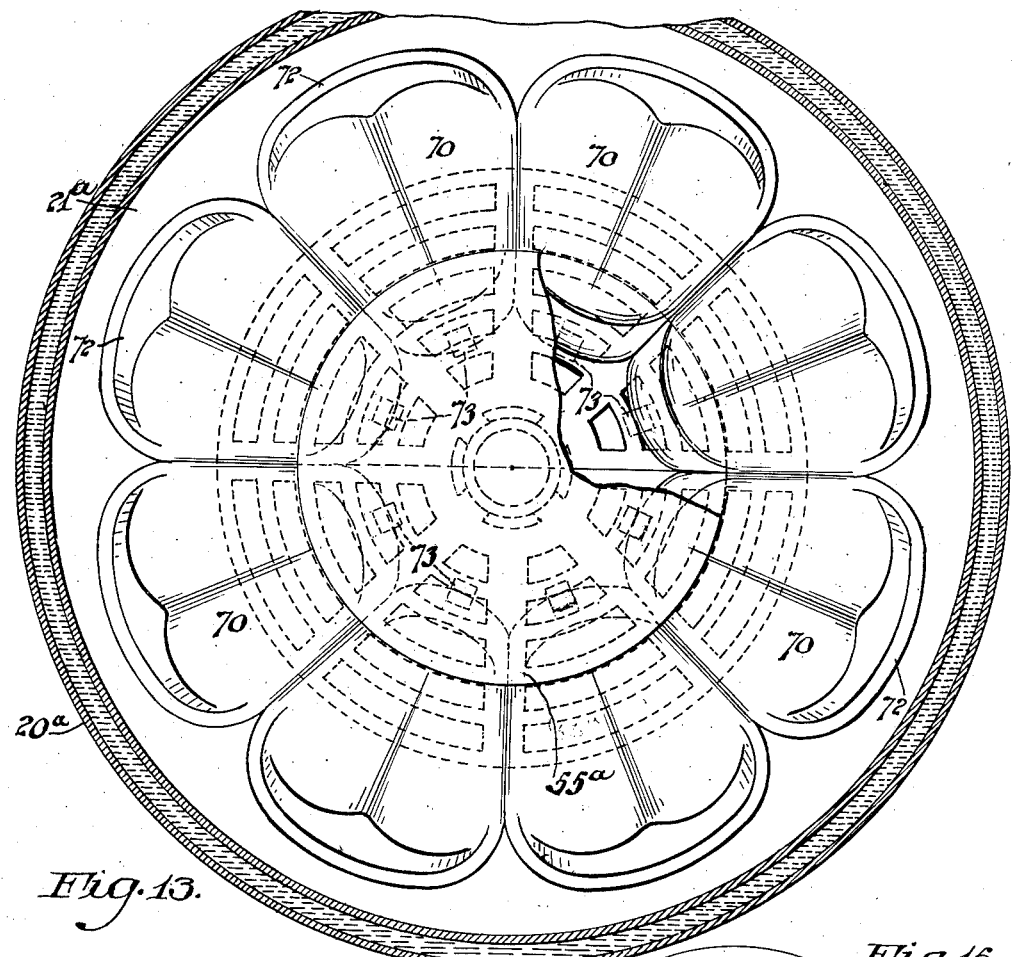
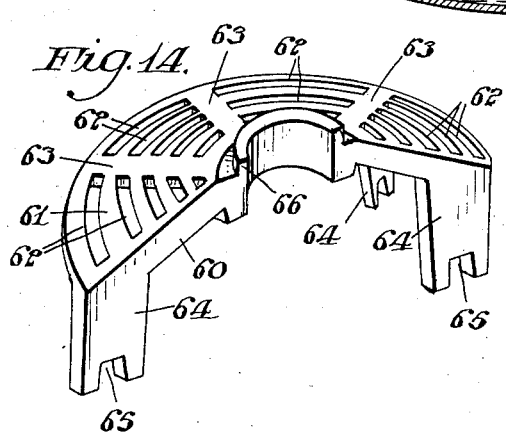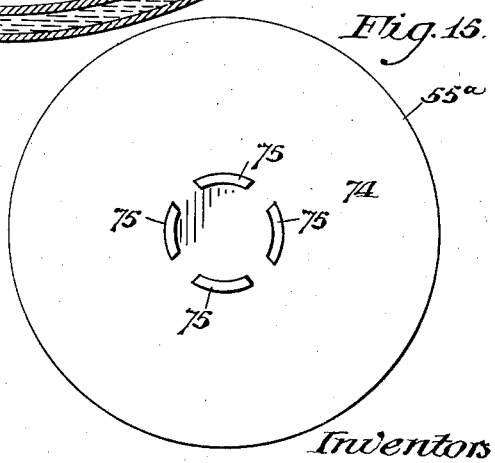

Patented Nov. 11, 1941

2,262,153

UNITED STATES PATENT OFFICE 2,262,153

BAFFLE FOR DOMESTIC HEATING FURNACES

William S. Wykes, Philadelphia, Pa., and Edward I. Jaffe, Collingswood, N. J.

Application March 30, 1940, Serial No. 326,834

14 Claims. (Cl. 110—97)

This invention relates to baffles for domestic heating furnaces and more particularly to an improved form of baffle construction which may be quickly and easily installed and which will be effective in its operation.

In many domestic heating furnaces, particularly those which are of old design and which have been in use for a number of years a streamlining effect of the hot gases of combustion occurs within the furnace. There is very often insufficient turbulence within the furnace space and excessive velocity of travel of the gases to the stack. The hot gases of combustion do not have an adequate opportunity to give up their heat because of their rapid movement and also because of the relatively smaller heat transfer surface in the older domestic heating furnaces. A large quantity of heat is carried off in the combustion gases and passes into the stack and this heat is not utilized for the purpose of heating the fluid, water or air, of the house heating system. This is particularly true in furnaces originally intended for burning coal, but which have been converted by the installation of oil burning equipment or gas burning equipment.

It is the principal object, therefore, of the present invention to provide a baffle unit which will increase the effectiveness of the furnace in which the same is installed and thereby reduce the amount of fuel required.

It is a further object of the present invention to reduce the velocity of travel of the combustion gases in the interior of the furnace and increase the turbulence so that combustion is completed within the combustion space and more time is allowed for the absorption of heat by the heat absorbing surfaces of the furnace.

It is a further object of the invention to provide an improved form of baffle which will absorb an appreciable quantity of heat while combustion is occurring and retain the same, and, after combustion has been discontinued, continue to give off heat for absorption by the furnace walls.

It is a further object of the present invention to provide an improved form of baffle construction which, by the provision of a relatively small number of parts, will be suitable for use in the various sizes and shapes of fire boxes which are found in domestic heating furnaces now in use.

It is a further object of the present invention to provide a baffle construction which may be readily installed in existing domestic heating furnaces without the necessity for dismantling the same.

Other objects of the invention will be apparent from the annexed specification and claims.

The nature and characteristic features of the invention will be more readily understood from the following description, taken in connection with the accompanying drawings, forming part hereof, in which:

Fig. 3 is a vertical sectional view taken approximately on the line 3—3 of Fig. 1;

Fig. 4 is a view in perspective of one of the leg elements employed with the form of the invention illustrated in Figs. 1 to 3, inclusive;

Figs. 5 and 6 are views in elevation and in plan, respectively, of a cross bar employed with the form of the invention illustrated in Figs. 1 to 3, inclusive;

Figs. 7 and 8 are views in elevation and in plan respectively of a side or auxiliary cross bar employed with the form of the invention illustrated in Figs. 1 to 3, inclusive;

Fig. 9 is a view in perspective of a preferred form of corner fin used with the form of the invention illustrated in Figs. 1 to 3, inclusive;

Fig. 10 is a view in perspective of a preferred form of intermediate fin for use with the form of invention illustrated in Figs. 1 to 3, inclusive;

Fig. 11 is a view taken approximately on the line 11—11 of Fig. 3 and illustrating certain of the details of construction of the fin shown in Fig. 10;

Fig. 13 is a horizontal sectional view taken through the furnace shown in Fig. 12 and showing the baffle construction in a plan view;

Fig. 14 is a view in perspective and on a reduced scale of a crown piece employed with the form of the invention illustrated in Figs. 12 and 13;

Fig. 15 is an underneath plan view, on a reduced scale, of a cap piece employed with the form of the invention illustrated in Figs. 12 and 13.

It will, of course, be understood that the description and drawings herein contained are illustrative merely, and that various modifications and changes may be made in the structure disclosed without departing from the spirit of the invention.

Referring more particularly to Figs. 1 to 11 of the drawings, a preferred form of the baffle construction of the present invention is illustrated in connection with a domestic heating furnace 20 having a rectangular or substantially rectangular fire box 21 and which may be equipped with an oil burner 22. The furnace 20 may have side walls containing water which is to be heated for use in the heating system, although it will of course be understood that the furnace 20 may be of the hot air heating type.

Figure 1:
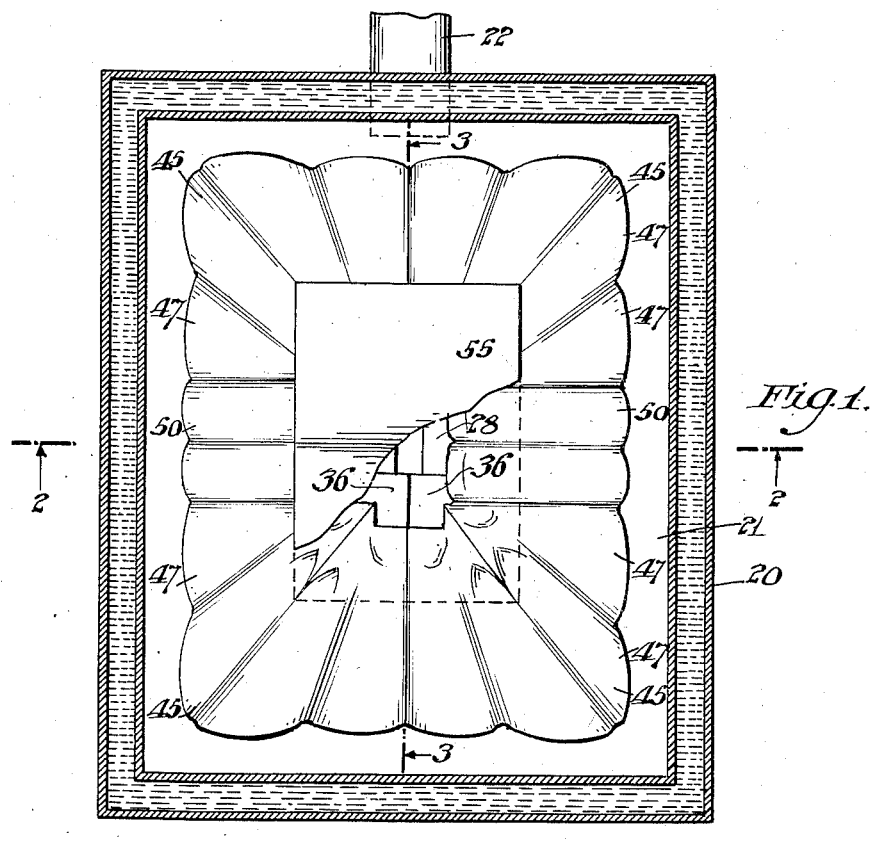
Figure 1 is a horizontal sectional view taken through a domestic furnace, the interior of which is rectangular, and showing in plan one embodiment of the present invention.
Figure 2:
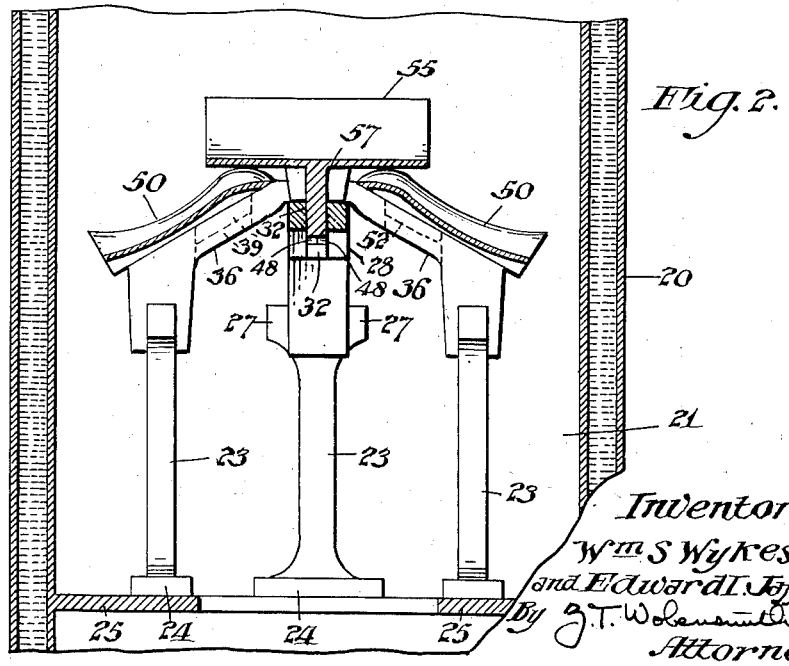
Fig. 2 is a vertical sectional view taken approximately on the line 2—2 of Fig. 1.
Figure 12:
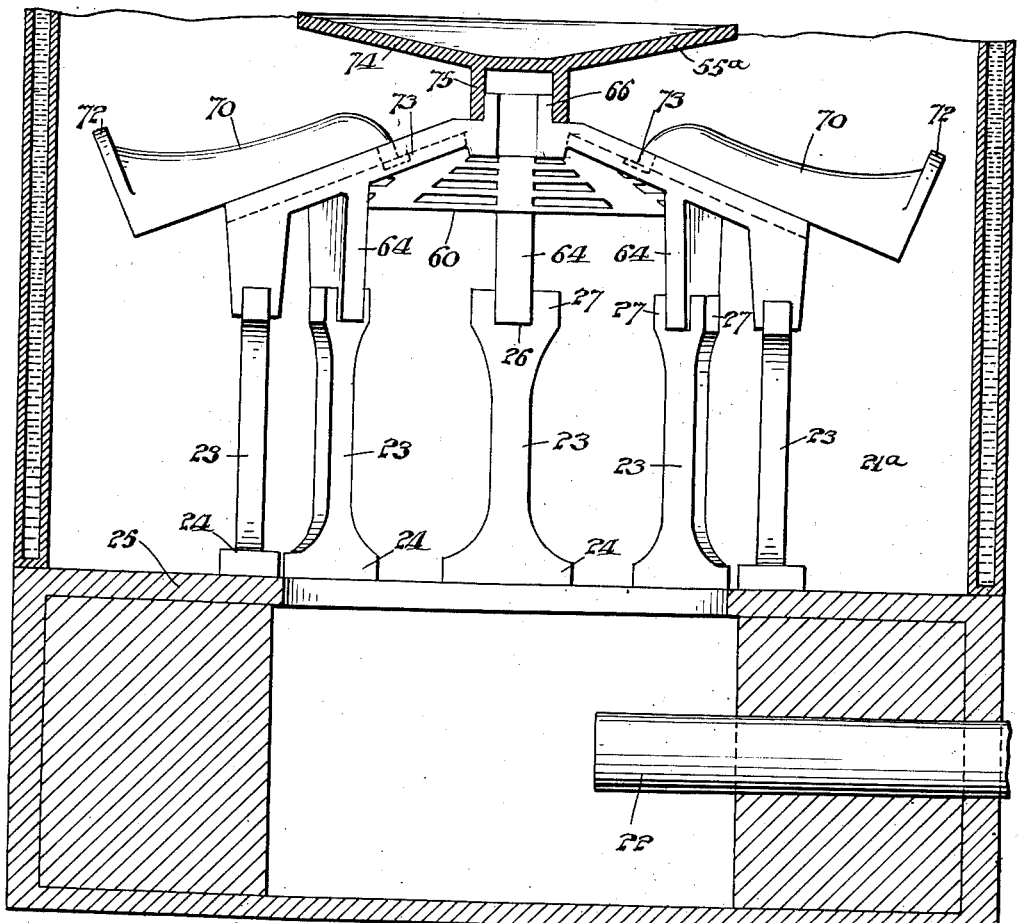
Fig. 12 is a central vertical sectional view taken through a domestic heating furnace, the interior of which is circular, and showing in vertical section, another embodiment of the baffle construction of the present invention.
Figure 16:
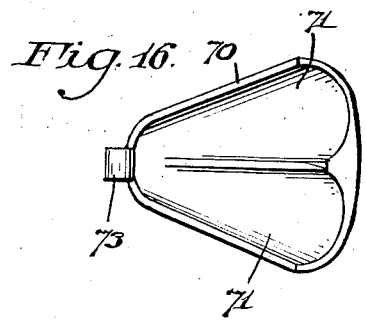
Fig. 16 is an underneath view of a fin employed with the form of invention illustrated in Figs. 12 and 13.

The baffle construction is preferably generally rectangular in plan, as illustrated particularly in Fig. 1. The parts of the baffle construction may be made of any desired material, but it is preferable to employ cast iron with suitable alloying materials added to assist in withstanding high temperatures. A plurality of leg members 23 are provided for supporting the other portions of the baffle construction. The lower end of each leg member 23 is preferably formed into a foot 24 which may rest on an inwardly projecting portion 25 of the furnace 20 and may, if desired, rest upon a supporting plate or strip (not shown) suitably supported within the furnace 20. The upper end of the leg member 23 is preferably forked, as illustrated in Fig. 4 so as to provide a horizontally disposed portion 26 and upwardly extending side portions 27. A sufficient number of leg members 23 are provided to furnish the required support and in some instances fewer legs will be needed than are shown.

A cross bar 28 illustrated in Figs. 5 and 6 is also provided and preferably has a central horizontally disposed portion 29. The length of the portion 29 is determined by the longer dimension of the furnace in which the baffle construction is to be installed. A few sizes of cross bars will suffice to accommodate the greater number of furnaces now in use. The horizontal portion 29 of the cross bar 28 is slotted as at 30. The cross bar 28 preferably also has downwardly inclined side portions 31 each of which is slotted as at 32 for purposes hereinafter referred to. The cross bar 28 has downwardly extending extremities 33 which are notched as at 34 for interlocking engagement with the forked portions 26, 27 of the leg members 23.

A plurality of side or cross bars 36 as illustrated in Figs. 7 and 8 are also provided, the side bars 36 each having a hooked portion 37 at the upper end thereof. The end of the hook 37 is of a thickness not in excess of half of the width of the slot 30 in the cross bar 28 for engagement therein so that oppositely extending side bars 36 may be disposed in locked engagement in the slot 30. The length of the side bars 36 will be varied as desired, but a relatively small number of sizes will be required for the majority of installations.

Each side bar 36 also has an inclined portion 38 with a slot 39 therein for a purpose hereinafter more fully referred to. The lower ends of the side bars 36 are notched as at 40 for interlocking engagement with the forked portions 26, 27 of the leg members 23.

Fins are provided and are preferably shaped for directing the gases in a turbulent path. A corner fin 45 as illustrated in Fig. 9 is provided and preferably has the upper side or face curved and flaring and the lower side or face thereof curved and flaring for directing the gas in a plurality of streams against the inner side walls of the furnace 20. The corner fins 45 are preferably composed of a plurality of flutings 46 which spread fan-like from the inner corner and are curved toward the outer edge 47. The outer edge portions 47 are also preferably curved (see Figs. 1 and 9). The fins 45 are also provided with two lugs 48 extending therefrom for holding the fins 45 in position. The lugs 48 are preferably disposed in engagement respectively with a slot 32 in the cross bar 28 and a slot 39 in the side bar 36.

Intermediate fins 50 as illustrated in Figs. 10 and 11 are also provided and preferably have the surfaces thereof formed of a plurality of fluted curved and flaring faces 51. The distance between the edges is determined by the space to be covered by the fins, although it will be clear that a plurality of intermediate fins 50 may be used edge to edge with a longer cross bar 28 and additional bars 36. The fins 50 are preferably also provided with a plurality of lugs or projections 52 for holding the fins 50 in position by interlocking engagement with the slots 39 in the side bars 36.

A cap piece 55 is also preferably provided consisting of a pair of tilted plates 56 with a downwardly extending projection 57. The lower part of the projection 57 is reduced in size to fit into the slot 30 of the cross bar 28 at the center thereof and support the cap piece 55.

The mode of installation and manner of use of the baffle construction illustrated in Figs. 1 to 11, inclusive, will now be pointed out. The baffle construction is installed by first placing the leg members 23 in position in the furnace 20 and then mounting a cross bar member 28 on one pair of leg members 23 with the lower end portions 33 of the cross bar member 28 in engagement with the forked upper end of the leg members 23. The side bar portions 36 are then inserted and the hooks 37 at the upper ends thereof engaged in the slot 30 of the cross bar 28. The notched portions 40 at the lower end of the side bar portions 36 are placed in engagement with the forked upper ends of the leg members.

The cross bar members 28 and the side bar portions 36 serve for connecting, in a rigid manner, the upper ends of the leg members 23 when in engagement therewith.

The corner fins 45 may then be inserted with the lugs 48 thereof in engagement respectively with a slot 39 in the side bar portion 36 and the slot 32 in the cross bar portion 28. The intermediate fin members 50 may be inserted between the corner fin members 45 and with the lugs 52 thereof in engagement with the slots 39 of the side bar members 36. It will be noted that the slots 39 in the side bar members 36 each accommodate lugs of adjoining fins and provide for an additional interlocking of the fins and the bars. The cap member 55 is then inserted in place and the structure is ready for use.

The hot gases and products of combustion from the burner or grate which move upwardly in the furnace 20 may pass between the leg members 23 and in contact with the adjacent side walls of the furnace. The gases which pass upwardly are directed by the lower faces of the fins 45 and 50 downwardly and outwardly into contact with the furnace walls. Any gases which pass upwardly through the baffle are also directed by the cap member 55 outwardly for contact with the walls, the upper faces of the fins 45 and 50 also assisting in creating turbulence of the gases and contact thereof with the inside walls of the furnace 20. The fins 45 and 50 are preferably disposed so that the space between the outermost edges of the fins and the furnace wall is of the order of one to two inches.

The form of the invention illustrated in Figs. 12 to 16, inclusive, is intended for furnaces having a circular interior space 21ᵃ. A plurality of leg members 23 are provided for supporting the other portions of the baffle construction. The lower end of each leg member 23 is preferably formed into a foot 24 which may rest on a portion 25 of the furnace 20 or, if desired, rest upon a supporting plate or strip (not shown) suitably mounted within the furnace 20. The upper end of the leg member 23 is forked as at 26 and 27 for receiving other portions of the structure.

A crown is provided preferably consisting of two crown members 60, the crown members 60 each consisting of a frusto-conical portion 61 provided with a plurality of sets of slots 62 at increasing distances from the center, solid portions 63 being provided at the locations between the ends of the slots 62. At the lower and outer end of each solid portion 63 downward projections 64 are provided, the projections 64 being notched at the lower end thereof as at 65 for engagement with the forked ends of the leg members 23. The central portion of the crown members 60 has an upwardly projecting ring 66 for purposes hereinafter more fully referred to. The crown members 60 preferably also have flat faces for contact and the downwardly extending portions 64 adjacent these flat faces are preferably made of a thickness such that the two adjacent downwardly extending portions 64 of associated crown members 60 are located together in a single forked portion of a leg member 23 for locking engagement.

Fins 70 are provided for mounting in the crown members 60 and include flaring side portions 71 with curved and flaring surfaces therebetween on the upper and lower face of each fin 70. The fins 70 may also have an upwardly projecting rim portion 72. Each fin 70 is also preferably provided at the narrow portion thereof with a hooked lug 73 so that the fin 70 may be mounted in engagement in one of the slots 62 of the crown member 60.

A cap member 55ᵃ is also provided and preferably consists of a dished plate 74 preferably made in one piece and having a plurality of downwardly projecting portions 75 for engagement with the upwardly extending ring 66 on the crown pieces 60 for holding the crown pieces 60 together at the upward part thereof.

The mode of installation and the manner of use of the baffle construction illustrated in Figs. 12 to 16, inclusive, will now be pointed out.

The baffle device is installed by first placing the leg members 23 in the furnace 20 and then successively inserting the crown pieces 60 in position with the downwardly extending projections 64 in interlocking engagement with the forked upper ends of the leg members 23. The crown pieces 60 serve for connecting, in a rigid manner, the upper ends of the leg members 23 when in engagement therewith. The fins 70 are then put in place with their projections 73 hooked into the slots 62 at the desired position with the outer edges thereof circumferentially disposed as illustrated at Fig. 13 so that the ensemble of the fins 70 provides a serrated edge for increasing the turbulence of flow and the contact of the hot gases with the interior wall of the furnace 20. The cap piece 55ᵃ is then inserted in place and with the downward projections 75 thereof in engagement with the ring 66 on the crown piece 60.

The hot gases and products of combustion from the burner or grate will move upwardly in the furnace and may pass between the leg members 23 and in contact with the adjacent side walls of the furnace 20. The gases which pass upwardly are directed by the lower faces of the fins 70 downwardly and outwardly into contact with the furnace walls. The gases which pass upwardly through the baffle in the spaces are directed outwardly by the cap member 55ᵃ for contact with the walls.

In this form of baffle construction it is also preferable that the fins 70 in the assembled baffle be disposed so that the space between the outermost edges of the fins 70 and of the furnace wall is of the order of one to two inches.

It will be seen that with both forms of baffle construction herein disclosed stream-lining of the gases to the outlet of the furnace chamber is effectively prevented. The baffle constructions also increase the turbulence of the gases within the furnace chamber, and are effective for bringing the gases into contact with the heat absorbing walls of the furnace. The baffle constructions herein disclosed may be readily assembled and will remain in position without the necessity for employing bolts, rivets or similar devices which are incapable of withstanding the high temperatures to which such baffles are subjected. At the same time, also, the weight of the baffle is not excessive, while an adequate mass is provided for heat absorption and delivery of the heat to the furnace walls in the intervals which occur between active firing periods.

We claim:

1. In a baffle for insertion and assembly in the space within the interior of a heating furnace, the combination of a plurality of spaced upwardly extending legs having interlocking projections at the upper ends thereof, connecting members in interlocking engagement with the interlocking projections of at least two of said legs, and fins in interlocking engagement with a plurality of said connecting members, said fins being downwardly inclined and having upwardly flaring edge portions for directing furnace gases into intimate contact with the interior wall of the furnace space.

2. In a baffle for insertion and assembly in the space within the interior of a heating furnace, the combination of spaced upwardly extending legs having interlocking portions at the upper ends thereof, connecting members having interlocking projections in engagement with said interlocking portions, and a plurality of contiguous fins each in interlocking engagement with a plurality of said members, said fins being downwardly inclined and having upwardly flaring edge portions for directing furnace gases into intimate contact with the walls of the furnace space.

3. In a baffle for insertion and assembly in the space within the interior of a heating furnace, the combination of a plurality of spaced upwardly extending legs having interlocking projections at the upper ends thereof, connecting members in interlocking engagement with the interlocking projections of at least two of said legs, and fins each in interlocking engagement with at least one of said members, said fins being downwardly inclined and having the contiguous edge portions abutting.

4. In a baffle for insertion and assembly in the space within the interior of a heating furnace, the combination of spaced supports having upwardly disposed interlocking portions thereon, connecting members having downwardly disposed portions in interlocking engagement with the upper ends of said supports and said upwardly disposed interlocking portions, and fins having the inner portions in interlocking engagement with said members, said fins being downwardly inclined and having upwardly flaring edge portions.

5. In a baffle for insertion and assembly in the space within the interior of a heating furnace, the combination of spaced upwardly extending legs having upwardly disposed interlocking portions at the upper ends thereof, connecting members in interlocking engagement with said interlocking portions, and fins having the inner portions in interlocking engagement with said members, said fins being downwardly inclined and having upwardly flaring edge portions, said edge portions being shaped to provide serrations adjacent the interior wall of the furnace.

6. In a baffle for insertion in the space within the interior of a heating furnace, the combination of a plurality of spaced legs, a cross bar having the ends thereof in engagement with the upper ends of a pair of said legs, additional transversely disposed cross bars each having one end portion in engagement with said first-mentioned cross bar and the other end portion in interlocking engagement with the upper end of one of said legs, and fins mounted above said bars and each in interlocking engagement with a pair of said bars.

7. In a baffle for insertion in the space within the interior of a heating furnace, the combination of a plurality of spaced legs, a cross bar having the ends thereof in engagement with the upper ends of a pair of said legs, additional transversely disposed cross bars each having one end portion in engagement with said first-mentioned cross bar and the other end portion in interlocking engagement with the upper end of one of said legs, and fins mounted above said bars and each having a projection in interlocking engagement with at least one of said bars.

8. In a baffle for insertion in the space within the interior of a heating furnace, the combination of a plurality of spaced legs, a cross bar having the ends thereof in engagement with the upper ends of a pair of said legs, additional transversely disposed cross bars each having one end portion in engagement with said first-mentioned cross bar and the other end portion in interlocking engagement with the upper end of one of said legs, fins mounted above said bars and each having a projection in interlocking engagement with at least one of said bars, and a cap member spaced above said fins and extending outwardly over the inner portions of said fins.

9. In a baffle for insertion in the space within the interior of a heating furnace, the combination of a plurality of supporting members, a cross bar, said cross bar having end portions in interlocking engagement with said supporting members, additional transversely disposed cross bars in interlocking engagement with said first-mentioned cross bar, said additional cross bars having ends thereof in interlocking engagement with said supporting members, and fins mounted above and in interlocking engagement with said bars.

10. In a baffle for insertion in the space within the interior of a heating furnace, the combination of a plurality of supporting members, a cross bar, said cross bar having end portions in interlocking engagement with said supporting members, additional transversely disposed cross bars in interlocking engagement with said first mentioned cross bar, said additional cross bars having ends thereof in interlocking engagement with said supporting members, fins mounted above and in interlocking engagement with said bars, and a cap member carried by one of said bars, said cap member being spaced above said fins and extending outwardly over the inner portions of said fins.

11. In a baffle for insertion in the space within the interior of a heating furnace, the combination of a plurality of spaced upwardly extending legs, a cross bar, said cross bar having a horizontal portion and end portions in interlocking engagement with the upper ends of certain of said legs, additional transversely disposed cross bars in interlocking engagement with the horizontal portion of said first-mentioned cross bar, said additional cross bars having the ends thereof in interlocking engagement with the upper ends of others of said legs, fins mounted above and in interlocking engagement with said bars, and a cap member carried by one of said bars, said cap member being spaced above said fins and extending outwardly over the inner portions of said fins.

12. In a baffle for insertion in the space within the interior of a heating furnace, the combination of a plurality of spaced upwardly extending legs, a cross bar, said cross bar having a horizontal slotted portion and downwardly inclined end portions in interlocking engagement with the upper ends of certain of said legs, additional transversely disposed downwardly inclined cross bars in interlocking engagement with the horizontal slotted portion of said cross bar, said additional cross bars having the lower ends thereof in interlocking engagement with the upper ends of others of said legs, fins mounted above and in interlocking engagement with said bars.

13. In a baffle for insertion in the space within the interior of a heating furnace, the combination of a plurality of spaced upwardly extending legs, a cross bar, said cross bar having a horizontal slotted portion and slotted downwardly inclined end portions in interlocking engagement with the upper ends of certain of said legs, additional transversely disposed downwardly inclined slotted cross bars in interlocking engagement with the horizontal slotted portion of said cross bar, said additional cross bars having the lower ends thereof in interlocking engagement with the upper ends of others of said legs, and fins mounted above said bars and having projections in interlocking engagement with the slots in said bars.

14. In a baffle for insertion in the space within the interior of a heating furnace, the combination of a plurality of spaced upwardly extending legs, a cross bar, said cross bar having a horizontal slotted portion and slotted downwardly inclined end portions in interlocking engagement with the upper ends of certain of said legs, additional downwardly inclined slotted cross bars in interlocking engagement with the horizontal slotted portion of said cross bar, said additional cross bars having the lower ends thereof in interlocking engagement with the upper ends of others of said legs, fins mounted above said bars and having projections in interlocking engagement with the slots in said bars, and a cap member carried by one of said bars, said cap member being spaced above said fins and extending outwardly over the inner portions of said fins.

WILLIAM S. WYKES.
EDWARD I. JAFFE.